(12) United States Patent
Jones et al.

(10) Patent No.: US 8,566,166 B1
(45) Date of Patent: *Oct. 22, 2013

(54) RULE-BASED BIDDING PLATFORM

(75) Inventors: Graham Jones, Los Angeles, CA (US); Dominique Jean, Los Angeles, CA (US); Robert Ritter, Marina del Rey, CA (US)

(73) Assignee: Pricegrabber.com, Inc., Los Angeles, CA (US)

( * ) Notice: Subject to any disclaimer, the term of this patent is extended or adjusted under 35 U.S.C. 154(b) by 191 days.

This patent is subject to a terminal disclaimer.

(21) Appl. No.: 13/013,591

(22) Filed: Jan. 25, 2011

Related U.S. Application Data

(60) Provisional application No. 61/298,176, filed on Jan. 25, 2010.

(51) Int. Cl.
*G06Q 30/00* (2012.01)

(52) U.S. Cl.
USPC .................................................... 705/14.71

(58) Field of Classification Search
USPC ..................................................... 705/14.71
See application file for complete search history.

(56) References Cited

U.S. PATENT DOCUMENTS

| | | | |
|---|---|---|---|
| 6,285,987 B1 | 9/2001 | Roth et al. | |
| 2003/0135460 A1 | 7/2003 | Talegon | |
| 2006/0122879 A1 | 6/2006 | O'Kelley | |
| 2006/0259360 A1 * | 11/2006 | Flinn et al. | 705/14 |
| 2007/0022011 A1 | 1/2007 | Altberg et al. | |
| 2007/0100708 A1 * | 5/2007 | Smith et al. | 705/26 |
| 2007/0299682 A1 | 12/2007 | Roth et al. | |
| 2008/0052195 A1 | 2/2008 | Roth et al. | |
| 2008/0059361 A1 | 3/2008 | Roth et al. | |
| 2008/0059362 A1 | 3/2008 | Roth et al. | |
| 2008/0126238 A1 | 5/2008 | Banbury et al. | |
| 2008/0183675 A1 | 7/2008 | Schwarz | |
| 2008/0208841 A1 | 8/2008 | Zeng et al. | |
| 2008/0255922 A1 | 10/2008 | Feldman et al. | |
| 2008/0275777 A1 | 11/2008 | Protheroe et al. | |
| 2009/0037317 A1 | 2/2009 | Zhou et al. | |
| 2009/0055268 A1 | 2/2009 | Knoller et al. | |
| 2009/0099909 A1 | 4/2009 | Phan | |
| 2009/0106094 A1 | 4/2009 | DeLine et al. | |
| 2009/0164300 A1 | 6/2009 | Gupta et al. | |
| 2009/0171710 A1 | 7/2009 | Shrivathsan et al. | |
| 2009/0171721 A1 | 7/2009 | LeBaron et al. | |
| 2009/0216642 A1 | 8/2009 | Ho et al. | |
| 2009/0248534 A1 | 10/2009 | Dasdan et al. | |

FOREIGN PATENT DOCUMENTS

WO    WO 2007041159    4/2007

* cited by examiner

*Primary Examiner* — Naresh Vig
(74) *Attorney, Agent, or Firm* — Knobbe Martens Olson & Bear LLP

(57) ABSTRACT

A computing system is configured to accept bid rules from merchants for the placement of ads for a plurality of products. The bid rules comprise a bid amount, a rule definition and a priority. The bid amount may be an absolute bid or it may be relative to base advertising rate. The rule definition comprises criteria for describing products to determine when the bid rule is applied to a product for sale. The priority indicates whether the bid rule applies to a particular product when the rule definition of more than one bid rule could be applied to a product. The computing system is also configured to generate a list of product offers based at least in part on the bids. The system may also generate reports for merchants.

22 Claims, 11 Drawing Sheets

Criteria Type: ☑ Price
- ○ Equal to : $ ____
- ○ Greater : $ ____
- ⦿ Less : $ ____
- ○ Price Range : $ ____ to $ ____

▶ Taxonomy
▶ Manufacturer ❓

Priority: ❓ [8]

Figure 3A

Criteria Type:

Criteria Type: ☐ Price
☑ Taxonomy
- Channel: [- select channel -]
- Category: [- select channel -]
- Sub-Category: [- select channel -]

☐ Manufacturer ❓

Priority: ❓ [8]

RULE-BASED BIDDING PLATFORM

CROSS REFERENCE TO RELATED APPLICATIONS

This application claims priority from U.S. Provisional Application No. 61/298,176, filed Jan. 25, 2010, which is hereby incorporated by reference in its entirety.

BACKGROUND

1. Field of the Disclosure

This disclosure relates to systems and methods for adjusting base advertising rates.

2. Background of the Disclosure

Currently, many merchants advertising products for sale on-line are charged for advertising based on a cost-per-click ("CPC") model. In the CPC model, a merchant is charged a fee each time a potential consumer clicks on an advertisement for the merchant's product offer. The CPC rates for goods or services are generally defined by a rate card. A rate card defines advertising rates based on the type of good or service being sold. Rate cards are traditionally set and updated by a merchant's account manager or by a media outlet offering advertising. When rate cards are set by the media outlet, a problem arises when many merchants offer the same product or service as it may become difficult for merchants to receive advantageous ad placement. Furthermore, the static nature of rate cards prevents merchants from adjusting their advertising based on dynamic sales data. Thus, there is a need for allowing merchants more flexibility in setting CPC rates.

SUMMARY OF THE DISCLOSURE

In one embodiment, a system accepts bid rules for making dynamic adjustments to the CPC rates of products offered for sale by a merchant. The system generates a computer interface for inputting bid rules. Each bid rule may include a bid amount, a rule definition, and/or a priority. The bid amount indicates what adjustment is to be made to the CPC rate of a product offer. The bid amount may be absolute where it overrides the CPC rate defined in the rate card for the product. In that case, the merchant is charged the bid amount as an advertising rate. Alternatively, the bid amount may be relative to the amount defined in the rate card for the product. When the bid amount is relative, the merchant is charged the CPC rate defined in the rate card for the product plus the bid amount. Relative bid amounts may be negative. The rule definition (also referred to as a "bid criteria") includes criteria for matching products to the bid rule. A rule definition comprises one or more product conditions. Each product condition may be one of price, taxonomy, manufacturer, and/or any other product attribute. In the case where bid criteria of multiple bids each match a particular product offer, the system determines which bid rule applies to the product offer using the priorities associated with the multiple matching bid rules. The system transmits the user interface to a merchant computing system and then accesses the bid rule entered by the merchant. The present disclosure also describes systems and methods of accepting bid rules. In one embodiment, a bidding platform computing device generates a computer interface that may be used by merchants to provide bid rules for the advantageous placement of ads offering products for sale. The bid rules may comprise a bid amount, a rule definition and a priority. The user interface is transmitted to a merchant computing device and the bidding platform computing device receives the bid rules entered by the merchant.

BRIEF DESCRIPTION OF THE DRAWINGS

FIG. 3A illustrates an exemplary user interface for adding bid rules for merchant products based on the price of the products.

FIG. 3B illustrates an exemplary user interface for adding bid rules for merchant products based on the taxonomy of the products.

FIG. 3E illustrates an exemplary user interface for adding bid rules for merchant products based on the price, the taxonomy and the manufacturer of the products.

DETAILED DESCRIPTION OF THE PREFERRED EMBODIMENT

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1A:
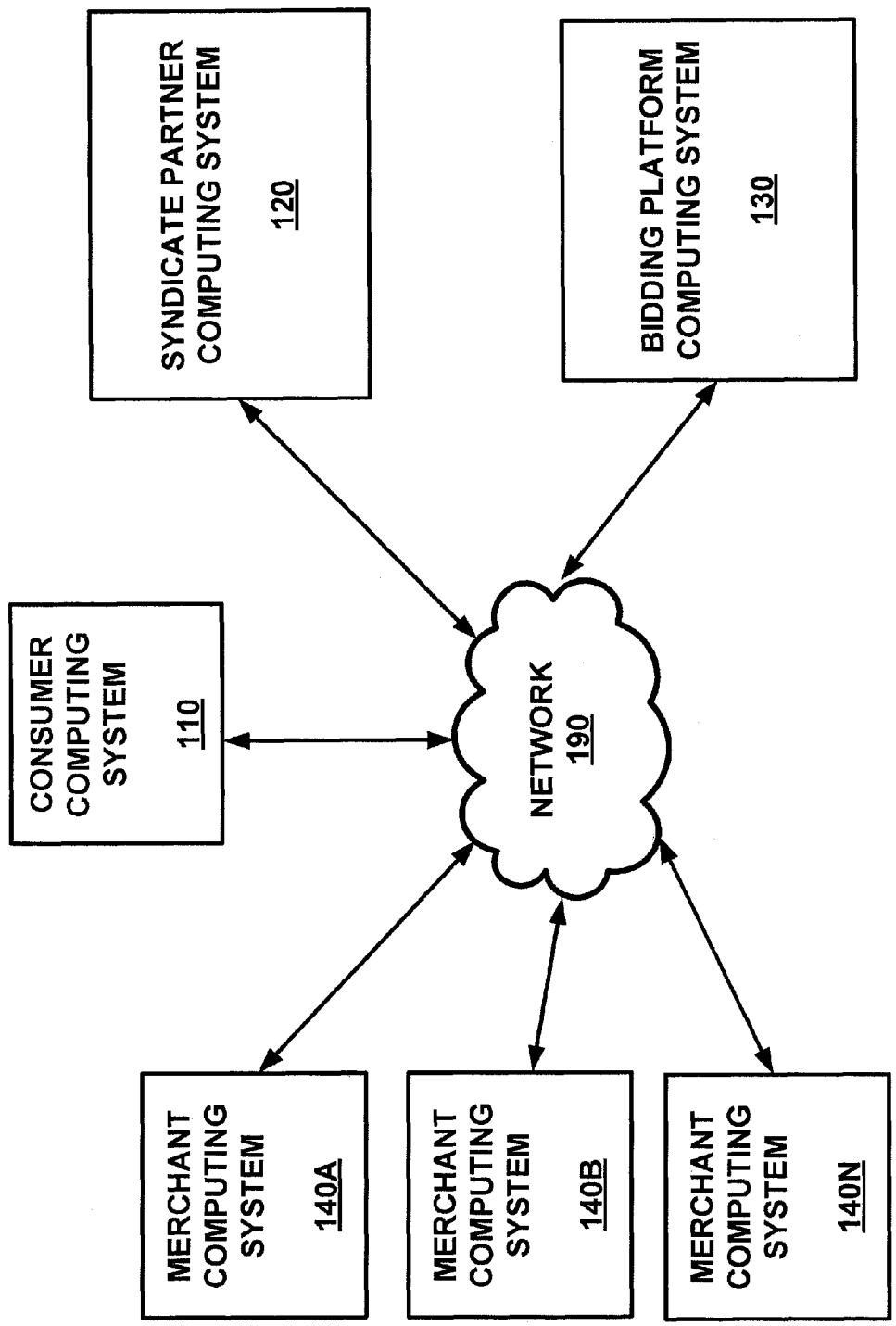
FIG. 1A is a block diagram illustrating one embodiment of a rule based bidding platform computing system in communication with a consumer computing system, a syndicate partner computing system and one or more merchant computing systems.

FIG. 1A is a block diagram illustrating one embodiment of bidding platform computing system 130 (or "bidding system 130") in communication with consumer computing system 110, syndicate partner computing system 120 (or "partner system 120"), and one or more merchant computing systems 140 (including merchant computer system 140A, merchant computing system 140B, and merchant computing system 140N). Partner system 120 may, for example, host a website where visitors may search for products and/or product information. In addition, partner system 120 may present product offers from multiple merchants offering products for sale. Consumer computing system 130 may access partner system 120 to search for products or product information in an attempt to find the most attractive purchasing option. Partner system 120 may aggregate multiple product offers and generate a user interface displaying the product offers and transmit it to consumer computing system 110. In one embodiment, partner system 120 may present multiple product offers from multiple merchants for the same product. Merchant computing systems 140 may, for example, offer several products for sale. For example, consumer computing system 110 may access a website hosted by one of merchant computing systems 140 to purchase a product. A user of consumer computing system 110 may be able to purchase a product directly from one of merchant computing systems 140.

In one embodiment, the system outlined in FIG. 1A is computerized, wherein each of the illustrated components comprises a computing device that is configured to communicate with other computer devices via network 190. For example, consumer computing system 110 may comprise a computing device, such as a desktop, notebook, or handheld computing device that is configured to transmit and receive data to/from other computing devices via network 190. Similarly, each of the merchant computing systems 140, syndicate partner computing system 120 and bidding platform computing system 130, may include one or more computing devices that are configured to communicate data with other computing devices via network 190. Depending on the embodiment, network 190 may comprise one or more of any type of network, such as one or more local area networks, wide area networks, personal area networks, telephone network, and/or the Internet, which may be accessed via any available wired and/or wireless communication protocols. Thus, network 190 may comprise a secure LAN through which bidding platform computing system 130 and partner system 120 communicate, and network 190 may further comprise an Internet connection through which bidding platform computing system 130 and consumer computing system 110 communicate. Any other combination of networks, including secured and unsecured network communication links, are contemplated for use in the systems described herein.

Figure 1B:
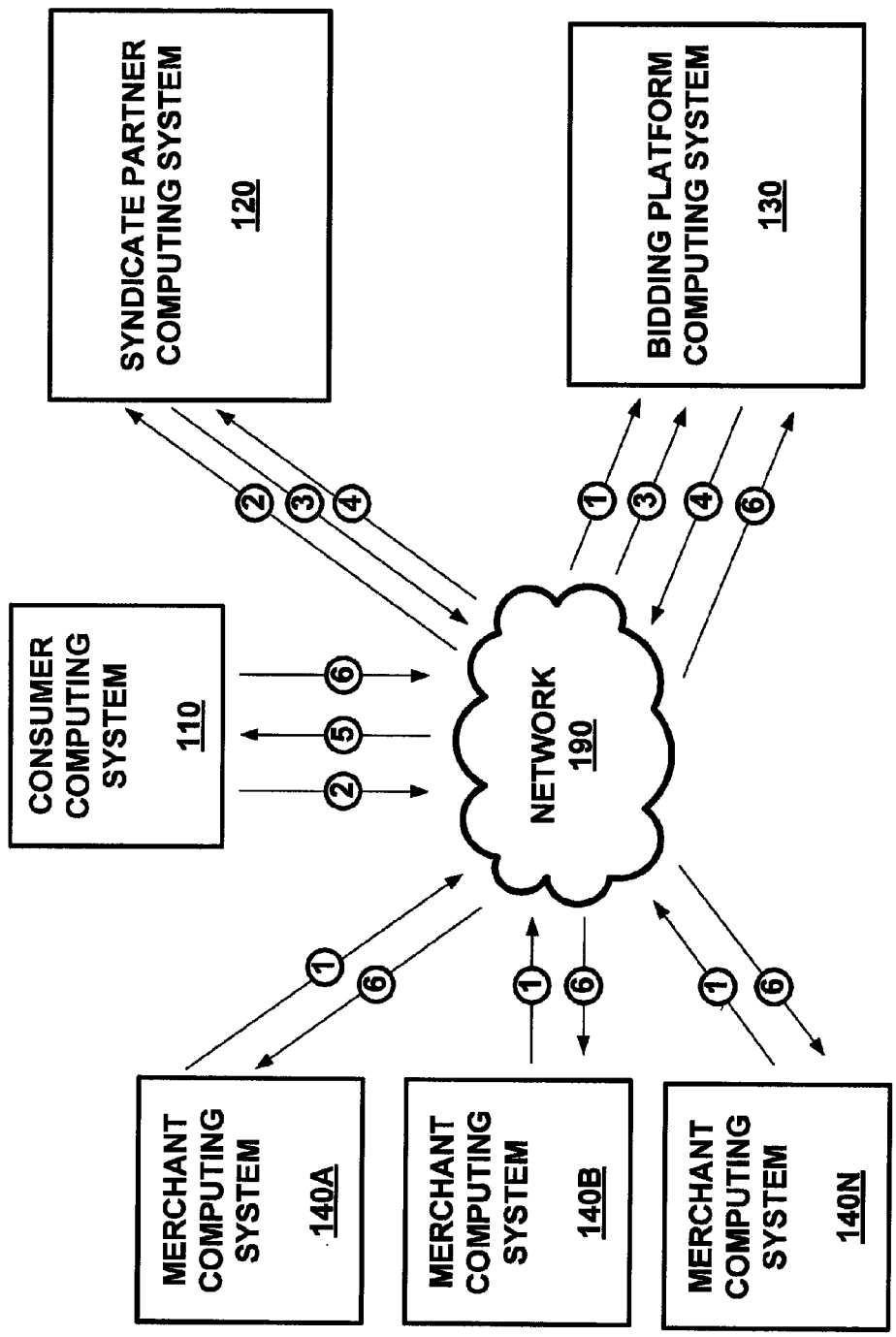
FIG. 1B is a block diagram illustrating another embodiment of a rule based bidding platform computing system in communication with a consumer computing system, a syndicate partner computing system and one or more merchant computing systems, where an exemplary temporal flow of data is outlined.

FIG. 1B is a block diagram illustrating another embodiment of bidding platform computing system 130, consumer computing system 110 and one or more merchant computing systems 140 of FIG. 1A, where an exemplary temporal flow of data is outlined. In particular, the circled numerals of FIG. 1B illustrate the order in which data flows between the various components of FIG. 1B according to one embodiment. In another embodiment, the steps outlined by the circled numerals may be performed in a different order, and the method may include fewer or additional steps.

In step one of FIG. 1B, bidding platform computing system 130 receives bid rules and product offers from one or more merchant computing systems 140. In one embodiment, the bid rules are received through bidding tool user interface 300 (FIG. 3) or similar user interface generated by bidding platform computing system 130. Bidding tool user interface 300 may then be transmitted through network 190 to merchant computing systems 140. A user of merchant computing systems 140 may enter one or more bid rules through bidding tool user interface 300. In one embodiment, a bid rule may modify the base CPC rate of a particular product offer when the rule definition of the bid rule matches the product of the product offer.

Rule definitions (also referred to as "bid criteria") may comprise criteria for identifying one or more products the merchant is offering for sale. In one embodiment, the rule definition criteria may include one or more product conditions related to product prices. A product condition related to price, for example, may indicate that a bid rule applies to products below a specific price, above a specific price or between two prices. In another embodiment, the rule definition criteria may include one or more product conditions related to the product taxonomies. For example, bidding platform computing system 130 may define categories that describe groups of products with different levels of granularity, where each level provides a more specific description of the group of products. The highest level, for example, may be appliances, and the second highest level may be large kitchen appliances. The number of levels of granularity may vary from embodiment to embodiment as needed to accurately represent the products for which bidding platform computing system 130 accepts bid rules. In one embodiment, product taxonomy information provided by merchants is analyzed in order to associate respective products into one or more of the categories established by bidding platform computing system 130.

In another embodiment, the rule definition may include one or more product conditions related to the manufacturer of the product. For example, a product condition may indicate that a bid rule applies to products made by Brand X. In another embodiment, the rule definition criteria may include one or more product conditions related to any one of price, taxonomy or manufacturer. A rule definition, for example, may indicate that a bid rule applies to products that are laptop computers, priced below $1000, and manufactured by Brand X.

In some embodiments, rule definition criteria may include other descriptive information that may be used to identify a product or a set of products the merchant is offering for sale. For example, a rule definition may include other attributes independent of price, taxonomy or manufacturer, such as conversion rate (e.g., how many products sold per time period), product condition (new, used, excellent, good, fair, etc.), gender (e.g., for clothing), product compatibility (e.g., for auto parts, appliance parts, computers, etc.), size (e.g., for TVs, hard drives, etc.) or any other product-related attributes. Such attributes may be extracted from the product offers received from merchant computing systems 140. In one embodiment, the extracted attributes of product offers may not directly correspond to attributes that are used by bidding system 130. In such cases, bidding system 130 may normalize multiple sets of different product attributes received from multiple merchants by mapping them all to a common set of attributes defined by bidding system 130. These common attributes may then be used to associate respective products to one or more categories defined by the merchant 130. In this way, relationships between products of different merchants may be better compared using the same framework of attributes and categories. In another embodiment, bidding system 130 may map merchant defined product attributes to product categories (either merchant or bidding system defined product categories).

In one embodiment, bid rules are assigned priorities that are usable by bidding system 130 to select a highest priority bid rule in the case where bid criteria of multiple bid rules each match a particular product offer. For example, this may occur when the rule definitions of the bid rules are defined in such generic terms that they overlap with respect to a particular product offered for sale by the merchant. In such cases, the priority of the bid rules may be used to determine which bid rule to apply to the product offer. For example, a merchant may enter a first bid rule to modify the base CPC rate of all appliances and assign the bid rule a priority of 2. The merchant may enter a second bid rule that modifies the base CPC rate of all items manufactured by Brand X and assign the bid rule a priority of 1. If the merchant offers for sale an appliance made by Brand X, the rule definitions of the first bid rule and second bid rule will apply to the product offer since the first bid rule is triggered when the product is an appliance and the second bid rule is triggered when the product is made by Brand X. The priority of the first bid rule and second bid rule will then be used to determine which bid rule to apply to the product offer. In this example, the second bid rule that modifies the CPC rate based upon the manufacturer would apply to the product offer since it has a higher priority. Accordingly, the base CPC rate will be adjusted based upon the bid amount of the second bid rule.

In one embodiment, bid rules are assigned bid amounts that are used to determine how the base CPC rate defined in the rate card may be modified when the rule definition of the bid rule applies to a product offer. In one embodiment, the bid amount may be absolute such that the bid amount is used in place of a base CPC rate defined in the rate card. In another embodiment, the bid amount may be relative such that the bid amount is used to modify the base CPC rate defined in the rate card by the bid amount.

In another embodiment, bid rules may be set for specific products, such that the bid amounts of the product-specific bid rules override the base CPC rate of a product offer for the specific product. The bidding platform computing system 130 may generate a user interface for inputting product-specific bid rules and transmit the user interface to merchant computing systems 140. The user interface may provide search functionality allowing any one of merchant computing systems 140 the ability to find a particular product. The search functionality, for example, may include searching by price, taxonomy or manufacturer. In another embodiment, the search functionality may include searching based on any one of, or any combination of, price, taxonomy, manufacturer, and/or any other product attribute. The user interface may allow entry of bid amount. In one embodiment the bid amount be absolute, and in another embodiment it may be relative.

Referring back to step 1 of FIG. 1B, in another embodiment, bidding platform computing system 130 may receive CPC rates (e.g., bids) from a data feed as opposed to bidding tool user interface 300. In one embodiment, the data feed may include bid for specific products as opposed to a group of products, such that the bid amounts of the product-specific bid override the CPC rate of a product offer for the specific product. In another embodiment, the data feed may support entry of bid that modify the base CPC rate of a product offer based upon one or more rule definitions as described above. The data feed may comprise a text file, an spreadsheet, an XML file, a serialized object, a byte stream or any other mechanism known in the art to communicate data between computing systems.

Referring again to step 1 of FIG. 1B, in one embodiment, merchant computing systems 140 may provide bidding platform computing system 130 a list of product offers. Bidding platform computing system 130 may receive the list of product offers from the merchant computing system via the data feed described above. Each product offer may include, for example, a product description, a price, a model number and one or more descriptors related to the taxonomy of the product. The taxonomy of the product may relate to the category of good of the product offered for sale.

In one embodiment, bidding system 130 calculates the adjusted CPC rate of product offers whenever merchant computing systems 140 send an updated product offer list. Thus, the CPC rate for each of the products in a merchant's product offer list is determined and stored by the bidding system 130 so that the CPC rates are available in response to requests for placement of the various products to consumers. In some embodiments, bidding system 130 may calculate the adjusted CPC rate of product offers periodically or based on a predetermined schedule. Alternatively, bidding system 130 may calculate the adjusted CPC rate of product offers when merchant computing systems 140 submit new bid rules. In another embodiment, bidding system 130 may calculate the adjusted CPC rate of product offers based on any combination of the above methods.

In step 2 of FIG. 1B, consumer computing system 110 may make a request for product offers for one or more products, such as via a product search interface wherein the consumer typed a product search query. In one embodiment, the request may be for a uniquely identified product, such as a request for a particular make/model of product. In another embodiment, the request may be for a generically identified product, such as a general type of product. In one embodiment, the request, includes a set of criteria specified by the user of consumer computing system 110, such as one or more product category, search keyword(s), and/or any other product attribute filter. In one embodiment, the request may be received by a syndicate partner computing system 120. The syndicate partner computing system 120 may provide a user interface for entry of requests from a consumer computing system 110.

In step 3 of FIG. 1B, bidding platform computing system 130 receives a request for product offers from partner computing system 120. In one embodiment, the request that bidding system 130 receives from syndicate system 120 is the same request that syndicate system 120 received from consumer computing system 110. In another embodiment, syndicate system 120 modifies the request received from the consumer computing system 110. In another embodiment, bidding platform computing system 130 may receive a request for a product offer directly from consumer computing system 110. For example, partner system 120 may not be involved in the provision of product offers to the consumer computing system 110 in this embodiment. Instead, bidding system 130 may provide a user interface for entry of a request directly to the consumer computing system 110. Depending on the embodiment, the request may be for a uniquely identified product, for a generically identified product, and/or for products that match keywords provided by the consumer computing system 110. For example, product requests, whether from the consumer computing system 110 or the partner system 120, may not be for specific products, but rather, for a group of products based on product category, a search keyword or any product attribute filter describing one or more products.

In step 4 of FIG. 1B, bidding system 130 generates a list of product offers for the products matching the request received from partner computing system 120 (or in another embodiment, received directly from consumer computing system 110). In one embodiment, bidding system 130 determines the product offers matching the request. If more than one product offer matches the request, bidding system 130 may order the product offers based at least in part on the calculated CPC rate of products when it generates the list of matching product offers. In another embodiment, bidding system 130 may determine that some product offers matching the request will be excluded from the generated list of matching product offers. For example, product offers may be excluded based at least in part on the calculated CPC rate of the product offer and conditions established by syndicate partner computing system 120. In another embodiment, product offers may be excluded based on the identity of the merchant making the product offer. In one embodiment, once the list of matching product offers is created, bidding system 130 sends the list to partner computing system 120. In another embodiment, the list is sent to consumer computing system 110. In another embodiment, bidding system 130 generates a list of products, as opposed to product offers, matching a general request, such as one or more product category, search keyword(s), and/or any other product attribute filter, for products from partner computing system 120, or in other embodiments, consumer computing system 110. Bidding system 130 may determine a particular product offer to feature in the product list based at least in part on the calculated CPC rate for the particular product offer. For example, bidding system 130 may use special fonts, graphics or other displays to highlight a particular product offer having a highest CPC. In one embodiment, bidding system 130 uses the determined featured product offer as a representative product offer for a product category in a list including one or more product categories each associated with products matching a general product request. For example, if bidding system 130 received a request for washing machines from partner system 120, bidding system 130 may determine that product categories A, B and C match the request. Bidding system 130 may also determine that product offer X should be featured for category A, product offer Y should be featured for category B, and product offer Z should be featured for category C. When generating the list of products, bidding system 130 may use product offers X, Y and Z as representative offers of product categories A, B and C, respectfully.

Moving to step 5 of FIG. 1B, consumer computing system 110 receives the list of product offers. In one embodiment, the list is received from partner computing system 120. In another embodiment, the list is received from bidding system 130. In one embodiment, the product offer list may include one or more hyperlinks to a user interface generated by merchant computing systems 140 offering the product for sale. In another embodiment, consumer computing system 110 receives the list of products, but not product offers. The product list may include one or more hyperlinks to a user interface generated by bidding system 130 listing the product offers corresponding to the product. The user interface may order the product offers based at least in part on the calculated CPC rate of each product offer.

In step 6 of FIG. 1B, bidding system 130 receives data representing a product offer selected by the consumer using the consumer computing system 110. In one embodiment, the received data indicates which merchant computing system 140 offered the product for sale. This data may be used, for example, to determine the amount to charge the operator of the merchant computing system for the selection of its product offer by consumer computing system 110. In one embodiment, this determination is based in part on the calculated CPC rate of the selected product offer. In another embodiment, bidding system may use the received data when generating reports for merchants.

Figure 1C:
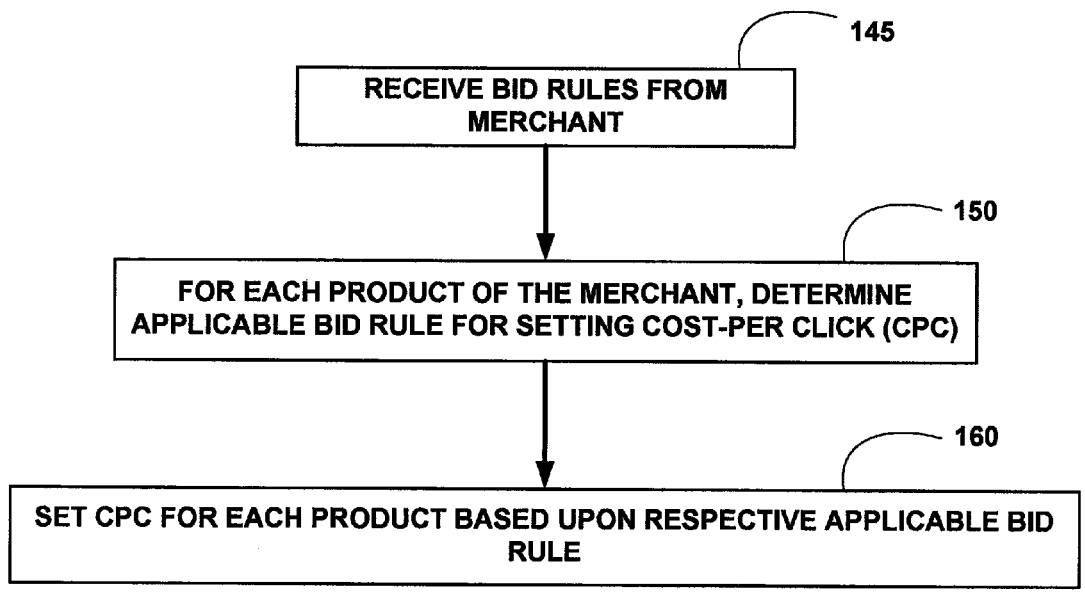
FIG. 1C is a flowchart illustrating the temporal flow of data for setting the CPC rate in one embodiment of a rule based bidding platform system in communication with a consumer, a syndicate partner computing system and one or more merchants.

FIG. 1C is a flowchart illustrating one embodiment of a method for setting the CPC rates of a plurality of products. In one embodiment, the method of FIG. 1C is performed by bidding system 130. However, the method may be performed by any other suitable computing device. Depending on the embodiment, the method may include fewer or additional blocks and/or the blocks may be performed in a different order than is illustrated.

Beginning in block 145, bidding system 130 receives bid rules from merchant computing systems 140. As described above, the bid rules may be received via a bidding tool user interface 300 or, in another embodiment, a data feed.

Next, in block 150, for each product the merchant offers for sale, bidding system 130 determines the applicable bid rule for setting the CPC rate of the product. For example, the bidding system 130 applies the bid rules established by the merchant in order to determine the appropriate CPC for each product. This process is described in further detail with reference to FIG. 1D, below.

Finally, in block 160, once the applicable bid rule is determined for respective products, bidding system 130 sets the CPC for the products based upon the respective applicable bid rule. In one embodiment, the CPC calculation may include the cost of additional services to increase product offer visibility in addition to the bid amount. For example, the CPC calculation may include the cost of displaying a logo, custom colors, custom fonts, displaying special images, banner placement, designation as a featured product, designation as a featured merchant, or any other means of increasing product offer visibility.

Figure 1D:
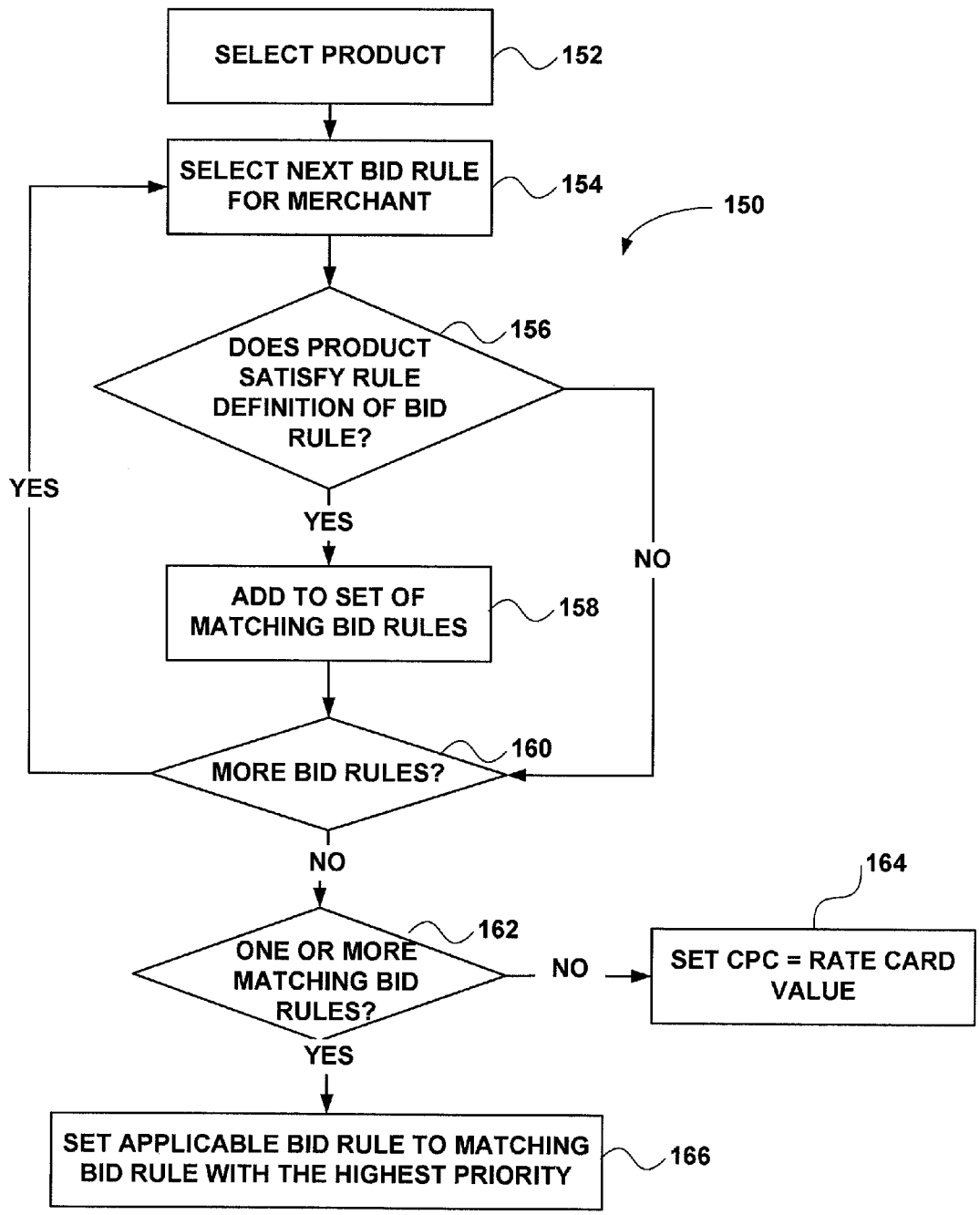
FIG. 1D is a flowchart illustrating the temporal flow of data for determining the applicable bid rule for setting the CPC rate in one embodiment of a bidding platform computing system in communication with a consumer, a syndicate partner and one or more merchants.

In one embodiment, the CPC rate may be calculated using a bid rule where the bid amount is absolute and overrides the base CPC rate defined in the rate card for the product. In another embodiment, the CPC rate may be calculated using a bid rule where the bid amount is relative to the base CPC rate defined in the rate card for the product. When the bid amount is relative to the base CPC rate for the product, the base CPC rate is adjusted by the bid amount and the final CPC rate is calculated using the adjusted base rate and the rate for any additional services to increase product visibility. Relative bid amounts may be a price value, such as $0.10, or in other embodiments, may be a percentage, such as 10%. Percentages may be positive, indicating a percentage increase in the rate card rate, or negative, indicating a percentage decrease in the rate card rate FIG. 1D is a flowchart illustrating one embodiment of a method of determining of the applicable bid rule for each of a plurality of products offered by a merchant. The method 150 of FIG. 1D may be part of the method of FIG. 1C. In one embodiment, the blocks of FIG. 1D may be performed when a merchant submits a data feed describing the products the merchant wishes to offer for sale. In another embodiment, the blocks of FIG. 1D may be performed on a periodic basis by bidding system 130, e.g., using a product list and/or bid rules that may have been updated by the merchant since the CPC rates were last set. In another embodiment, the blocks of FIG. 1D may be performed by bidding system 130 in response to receiving a new bid criteria from merchant computing system 140. Depending on the embodiment, the method of FIG. 1D may include fewer or additional blocks and blocks may be performed in a different order than is illustrated.

As described herein, the method of FIG. 1D is performed for each product offered for sale by a merchant, such that one bid rule is selected for each product and that bid rule can be used to set the CPC for the respective product offer. Beginning in block 152, the bidding system 130 selects a product from the plurality of products offered by a particular merchant, and accesses information regarding the product. For example, the bidding system 130 may select products in a sequential order, or in any other order.

Once a specific product is selected, in block 156 the bidding system 130 selects the next bid rule defined by the merchant for comparison with the currently selected product. Bidding system 130 may cycle through the bid rules in any order.

In block 156, bidding system 130 analyzes the rule definition of the bid rule in order to determine if the product satisfies the rule definition. As stated above, a rule definition may have one or more product conditions associated with various product attributes. Bidding system 130 compares the product conditions of the selected bid rule to the selected product. If the product satisfies all of the product conditions, the method continues to block 158 where the bid rule is added to a set of matching bid rules. If the product does not match the rule definition at block 156, the method continues to block 160 without adding the select bid rule to the list of matching bid rules.

In block 160, the bidding system 130 determines if there are more bid rules defined by the merchant offering the product for sale. If so, the method returns to block 154 and the bidding system 130 repeats blocks 154-160 for another bid rule defined by the merchant.

When the bidding system 130 determines in block 160 that there are no further bid rules to compare to the selected product, the method continues to decision block 162 where the bidding system 130 determines if there are one or more bid rules matching the product (e.g., if there are any bid rules on the list of matching bid rules). If there are no matching bid rules, bidding system 130 sets the CPC to the rate card value for the product in block 164 (or to some other value that is predetermined by the bidding system 130 and or the merchant in other embodiments).

In block 166, the bidding system 130 determines the applicable bid rule for the selected product based on the priorities of the matching bid rules. If there is only one matching bid rule, then the bid amount from that bid rule will be used to set the CPC, without consideration of the priority for the one matching bid rule. However, if there is more than one matching bid rule, then bidding system 130 determines the applicable bid rule based on the respective priority of each bid rule. In one embodiment, the bid rule with the highest priority will be set to the applicable bid rule. In one embodiment, the priority is a numerical value. The numerical value may represent a ranking order for the bid rules. For example, a bid rule with a priority of 1 would have a higher priority than a bid rule with a priority of 2. In another embodiment, the priority may be represented with letters or other symbols indicating an ordinal value. As noted in block 160 of FIG. 1C, once the applicable bid rule is determined, the base CPC rate for the product is set using the bid amount of the applicable bid rule. As stated above, bid amounts may be absolute or relative to the rate card rate. If the bid amount is absolute, the CPC rate is set to the bid amount. If the bid amount is relative, the rate card rate for the product is adjusted by the bid amount to determine the base CPC rate.

In another embodiment, the order of the calculation of modified base CPC rates may be based on the priority of the bid rules defined by merchant computing systems 140. For example, in one embodiment, bidding system 130 may select all of the bid rules for a merchant and start modifying CPC rates based on the bid rule with the highest priority. This may be, for example, the bid rule where the priority is set to 1. Next, bidding system 130 may determine all product offers that match the rule definition for the bid rule and modify the base CPC rates for those product offers. Then, bidding system 130 may analyze the bid rule with the second highest priority, for example, the bid rule where the priority is set to 2. Bidding system 130 then determines all product offers that match the rule definition for the bid rule of the second highest priority and for which bidding system 130 did not already modify the base CPC rate. Bidding system 130 then modifies the base CPC rates of the determined products. Bidding system then repeats the process for each bid rule of decreasing priority until all bid rules have been analyzed. In this embodiment, each time a bid rule is matched to one or more products, the lower priority bid rules are applied to a smaller set of products (because products that already have a higher priority matching bid rule are not again analyzed with reference to lower priority bid rules). Thus, the lower priority bid rules may be applied to a smaller (possibly much smaller) portion of the products, allowing the bid system 130 to more quickly assign advertising rates for product offers.

Figure 2:
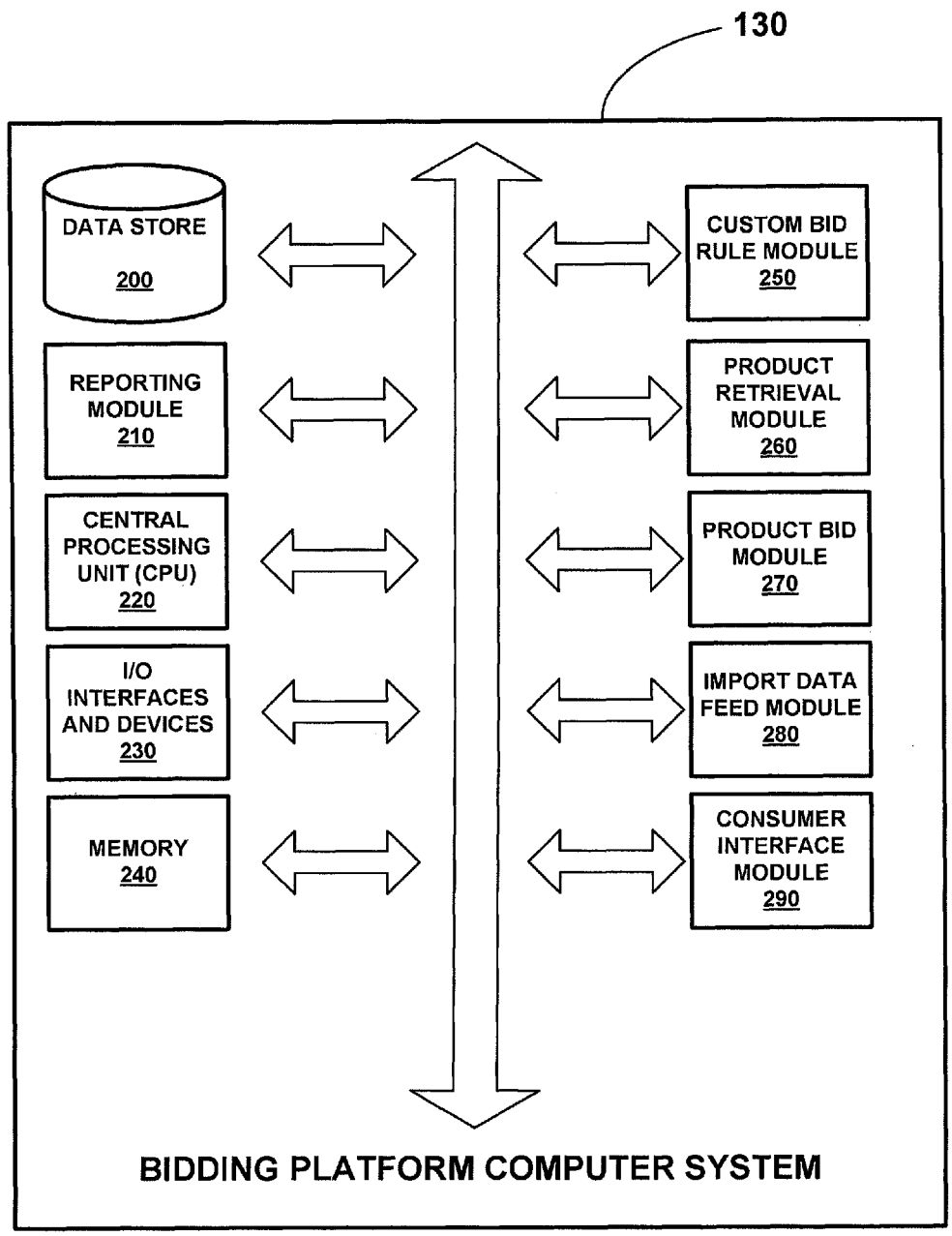
FIG. 2 is a block diagram illustrating one embodiment of a bidding platform computing system.

FIG. 2 is a block diagram illustrating one embodiment of bidding system 130. In one embodiment, bidding system 130 is configured to interface with multiple devices and/or data sources, such as in the exemplary network configurations of FIGS. 1A and 1B. Bidding system 130 may be used to implement certain systems and methods described herein. For example, in one embodiment bidding system 130 may be configured to generate bidding tool user interface 300, access bid rules from merchant computing systems 140, determine CPC rates for merchant products based on merchant-defined bid criteria, access requests from consumer computing system 110 and partner computing system 120 in order to identify product offers to be provided to consumer computing system 110, generate a list of matching product offers to provide to the consumer computing system 110 (which doesn't necessarily include all of the matching product offers), and generate a user interface for displaying the list of matching product offers. The functionality provided for in the components and modules of bidding system 130 may be combined into fewer components and modules or further separated into additional components and modules.

In general, the word module, as used herein, refers to logic embodied in hardware or firmware, or to a collection of software instructions, possibly having entry and exit points, written in a programming language, such as, for example, C, C++, or C#. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules may be stored in any type of computer-readable medium, such as a memory device (e.g., random access, flash memory, and the like), an optical medium (e.g., a CD, DVD, BluRay, and the like), firmware (e.g., an EPROM), or any other storage medium. The software modules may be configured for execution by one or more CPUs in order to cause the computing system 140 to perform particular operations.

It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In one embodiment, bidding system 130 includes, for example, a server or a personal computer that is IBM, Macintosh, or Linux/Unix compatible. In another embodiment, bidding system 130 comprises a laptop computer, smart phone, personal digital assistant, or other computing device, for example. In one embodiment, the exemplary bidding system 130 includes one or more central processing units ("CPU") 220, which may include one or more conventional or proprietary microprocessors. Bidding system 130 further includes a memory 240, such as random access memory ("RAM") for temporary storage of information and a read only memory ("ROM") for permanent storage of information, and a data store 200, such as a hard drive, diskette, or optical media storage device. In certain embodiments, the data store 200 stores product data, bid data and/or merchant data. Embodiments of data store 200 may store data in databases, flat files, spreadsheets, or any other data structure known in the art. Typically, the modules of bidding system 130 are in communication with one another via a standards based bus system. In different embodiments, the standards based bus system could be Peripheral Component Interconnect (PCI), Microchannel, SCSI, Industrial Standard Architecture (ISA) and Extended ISA (EISA) architectures, for example. In another embodiment, bidding system 130 leverages computing and storage services available over the Internet (cloud computing).

Bidding system 130 is generally controlled and coordinated by operating system and/or server software, such as the Windows 95, 98, NT, 2000, XP, Vista, Linux, SunOS, Solaris, PalmOS, Blackberry OS, or other compatible operating systems. In Macintosh systems, the operating system may be any available operating system, such as MAC OS X. In another embodiment, bidding system 130 may be controlled by a proprietary operating system. Conventional operating systems control and schedule computer processes for execution, perform memory management, provide file system, networking, and I/O services, and provide a user interface, such as a graphical user interface ("GUI"), among other things.

The exemplary bidding system 130 may include one or more commonly available input/output (I/O) interfaces and devices 230, such as a keyboard, mouse, touchpad, and printer. In one embodiment, the I/O devices and interfaces 230 include one or more display device, such as a monitor, that allows the visual presentation of data to a user. More particularly, a display device provides for the presentation of GUIs, application software data, and multimedia presentations, for example. In one embodiment, I/O interfaces and devices 230 comprise devices that are in communication with modules of bidding system 130 via a network, such as network 190 and/or any secured local area network, for example. In the embodiment of FIG. 2, the I/O devices and interfaces 230 provide a communication interface to various external devices. For example, in this embodiment bidding system 130 is in communication with a network, such as any combination of one or more LANs, WANs, or the Internet, for example, via a wired, wireless, or combination of wired and wireless, connections via a network interface of the I/O devices and interfaces 230.

In the embodiment of FIG. 2, bidding system 130 also includes several application modules that may be executed by CPU 220. More particularly, the application modules include custom bid rule module 250, product retrieval module 260, product bid module 270, import data feed module 280, consumer interface module 290, and reporting module 210.

In one embodiment, custom bid module 250 may comprise software code executable by CPU 220 that handles the generation of user interfaces for inputting bid information such as bidding tool user interface 300. Custom bid module 250 may also access bid rules inputted into the generated user interfaces by merchant computing systems 140. In one embodiment, the generated user interfaces may be transmitted via network 190 using I/O interfaces and devices 230. In one embodiment, custom bid module 250 may store and access merchant bid rules in/from data store 200.

Product retrieval module 260, in one embodiment, may comprise software code executable by CPU 220 that handles retrieval of product offers from data store 200. For example, the retrieval may be in response to a request from consumer computing system 110 or partner computing system 120. In one embodiment, product retrieval module 260 may be configured to calculate CPC rates for product offers as described above with reference to FIGS. 1C and 1D.

Product bid module 270, in one embodiment, may comprise software code executable by CPU 220 that handles the calculation and modification of CPC rates for product offers. For example, in one embodiment, product bid module 270 may calculate CPC rates as described in FIG. 1C and FIG. 1D. In another embodiment, product bid module 270 may calculate CPC rates for each merchant in bid priority order. For example, for each merchant, product bid module 270 may first determine the advertising rates for the product offers matching the rule definition of the bid rule having a priority of 1. Then, product bid module 270 may determine the advertising rates for the product offers matching the rule definition of the bid rule having a priority of 2 which were not already determined. Product bid module 270 may repeat this process until all bid rules for a merchant have been analyzed. In one embodiment, product bid module 270 may store and access modified CPC rates in/from data store 200.

In one embodiment, import data feed module 280 is software code executable by CPU 220 that handles the import of data feeds. Data feeds may be received from merchant computing systems 140 and may include the product offers of the merchants as well as bid rules to modify the base CPC rate for particular products. In another embodiment, import data feed module 280 may also access bid rules from merchant data feeds that include rule definitions as described above.

Consumer interface module 290 may include, in one embodiment, software code executable by CPU 220 that generates user interfaces sent to consumer computing systems 110. The generated user interfaces may be used by consumer computing devices to request product offers from bidding system 130.

In one embodiment, bidding system may include reporting module 210, which may comprise software code executable by CPU 220 that handles creation of reports that can be accessed by merchant computing systems 140. The reporting module may generate reports that list all of the products a merchant may offer for sale. The generated reports may include historical product information and may include information pertaining to the number of clicks a product has received over time. Reports may include information, for example, pertaining to product description, rate card rates, bid rules, CPC increases for holidays, costs for additional services for increasing visibility of the product, product identifiers such as UPC/ISBN, manufactures, prices, and number of clicks.

In one embodiment, reports may be provided as user interface that allows manipulation of the data in the report by the user of the merchant computing device. For example, reports may allow merchants to specify date ranges for display, where the date ranges may be inputted via a calendar pop-up interface. In another embodiment, reports may allow the user to sort the information based on the number of clicks a product has received. In addition, the reports may allow merchants to search for individual products or groups of products by price, taxonomy or manufacturer. Furthermore, the reports may allow merchants to show or hide data columns. In one embodiment, reporting module 210 may permit merchant computing systems 140 to export data in a customized format. The customized format may include .CSV files, spreadsheets, text files, proprietary formats for databases or reporting engines, serialized objects or some other data format known in the art. In one embodiment, the reporting module 210 may be configured to automatically generate and send a custom report to the merchant computing device.

As noted above, a bid rule may comprise a bid amount that is relative to the rate card rate. In one embodiment, the relative rate card rate may be negative, that is, the bid rule will adjust the base CPC for the product to a value below the rate card rate for the product. In one embodiment, the report generated by reporting module 210 may include a visual indicator such as a red "!" icon next to product offers with a CPC rate below the rate card to indicate the product offer may not appear in some lists generated in response to consumer product requests.

Figure 3:
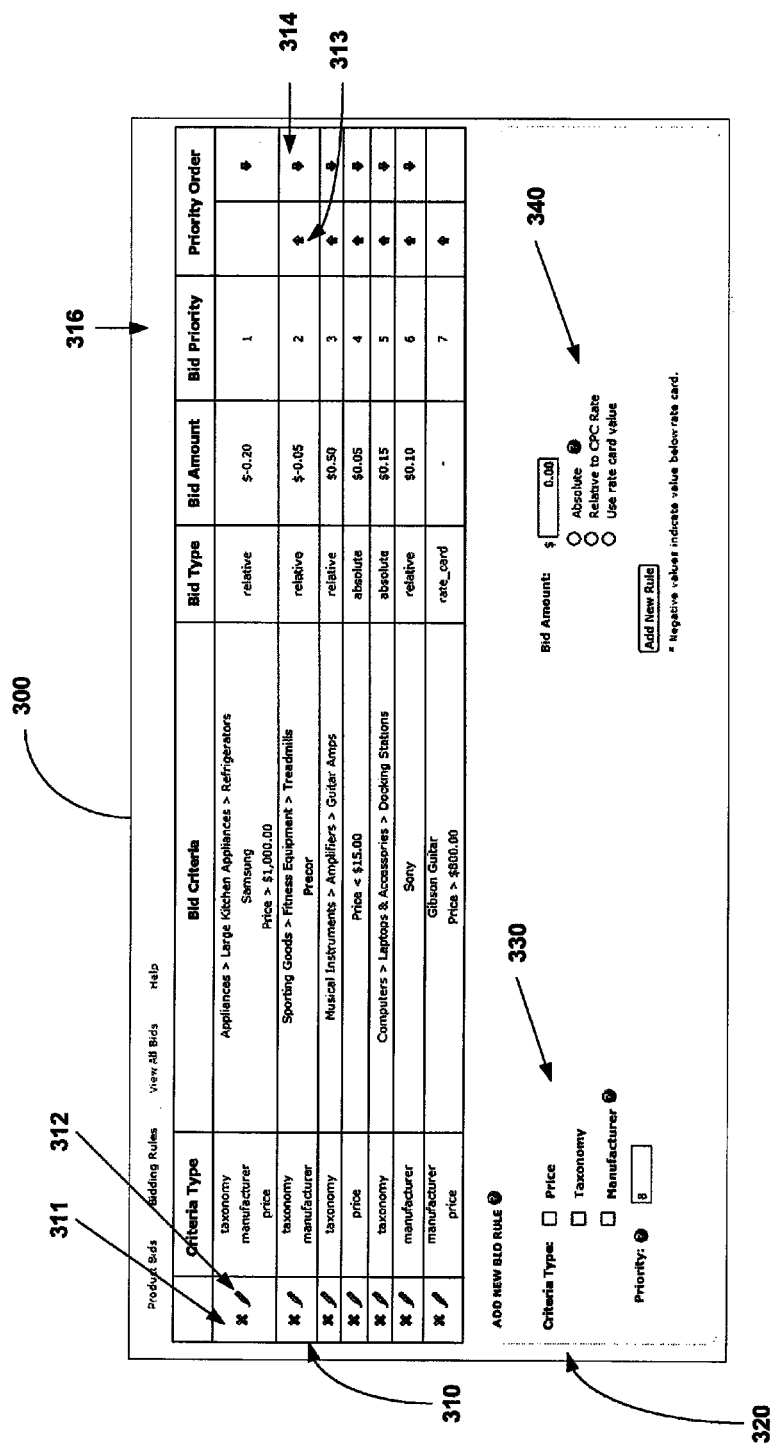
FIG. 3 illustrates an exemplary user interface for viewing, editing and adding bid rules for merchant products.

FIG. 3 illustrates an exemplary bidding tool user interface 300 for viewing, editing, and adding bid rules for merchant products. In one embodiment, bidding tool user interface 300 is generated by custom bid rule module 250 of bidding system 130 and is accessed via a web browser (or other software) on the merchant computing device. In the embodiment of FIG. 3, bidding tool user interface 300 includes a bid rule table 310 including several columns. This sample bid rule table 310 includes columns listing the bid rule type (e.g. the product offer attributes relevant to the bid, such as taxonomy, manufacturer, or price), the bid criteria (e.g., the rule definition), the bid type (e.g., relative or absolute), the bid amount, and the bid priority for each bid rule. In other embodiments, additional or less information may be received for each bid rule. Bidding tool user interface 300 may also include add new bid rule panel 320. Add new bid rule panel 320 may include bid definition panel 330 as well as bid amount panel 340.

In the embodiment of FIG. 3, bid rule table 310 includes user interface elements allowing the user to alter the elements of bid rules. For example, edit icon 312 and delete icon 311 allow a user to edit or delete a bid rule, respectfully, from bid rule table 310. In one embodiment, when a user selects delete icon 311, the user interface may display a confirmation (not shown) asking the user to confirm that bidding system 130 should delete the bid rule. In addition, when a user selects edit icon 312, a user interface for editing the bid rule may be displayed. The user interface for editing a bid rule may be similar to the user interfaces described in FIGS. 3A-3F with the bid rule information pre-populated.

The user interface 300 also indicates bid priorities in column 316 and provides interfaces for adjusting the priorities of bid rules. In this particular embodiment, the priority of bid rules may be adjusted up or down using the up arrow 313 and down arrow 314 user interface elements. For example, when a user selects up arrow 313, the priority of the associated bid rule will increase by one. Alternatively, when a user selects down arrow 314, the priority of the associated bid rule will decrease by one. In one embodiment, the priority may also be adjusted in bid rule table 310 by directly inputting the bid priority in bid rule table 310. When the priority of one bid rule is adjusted by the user, bidding system 130 will then adjust the priorities of other bid rules, as necessary. For example, when Bid rule A has priority 5 and Bid rule B has priority 4 and a user selects up arrow 313 associated with Bid rule A, bidding system 130 will change Bid rule A's priority to 4 and Bid rule B's priority to 5. Alternatively, if a user enters a priority that already exists when adding or editing a bid rule, bidding system 130 will assign the new bid rule the entered priority and will adjust all other affected bid rules accordingly. For example, if a user defines new Bid rule X with priority of 5, and Bid rule Y already has priority 5, bidding platform will adjust Bid rule Y's priority to 6. In this manner, bidding system 130 will insure that each bid rule in the system has a unique priority for a given merchant so that if there are multiple bid rules applicable to a product, only one bid rule will be applied to the product in accordance with the process outlined in FIG. 1D.

Figure 3C:
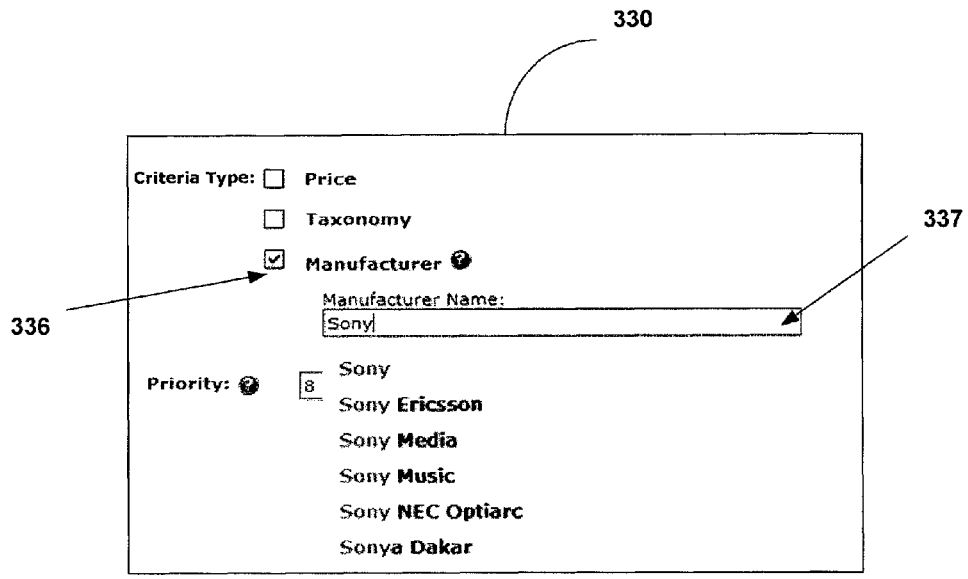
FIG. 3C illustrates an exemplary user interface for adding bid rules for merchant products based on the manufacturer of the products.
Figure 3D:
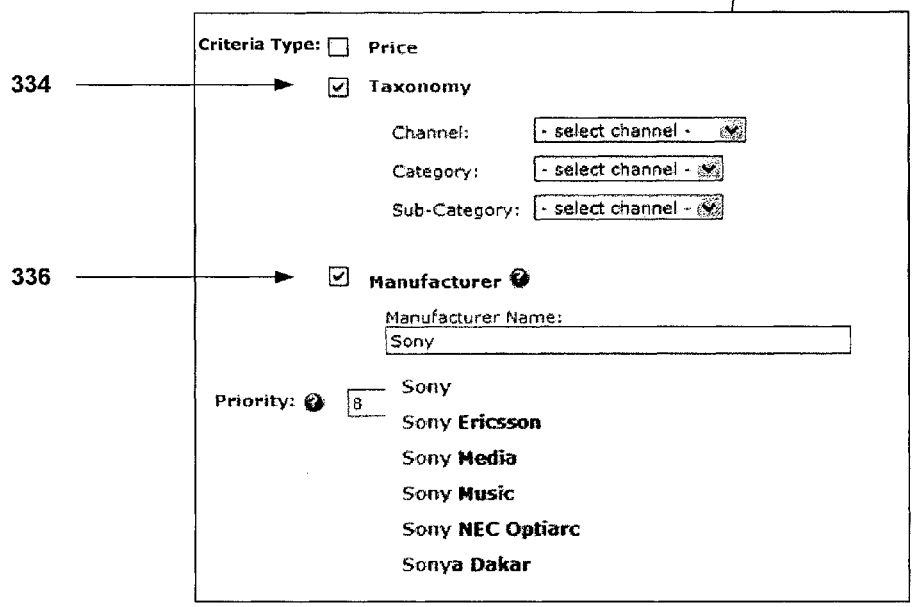
FIG. 3D illustrates an exemplary user interface for adding bid rules for merchant products based on the taxonomy and the manufacturer of the products.

FIGS. 3A-3E each illustrates the bid definition panel 330 of FIG. 3 with different bid rule conditions selected. As noted above, the bid definition panel 330 may be used to add or edit merchant bid rules based on any combination of price, taxonomy or manufacturer. Bid definition panel 330 includes check box inputs 331, 334 and 336 for selecting what product conditions (e.g., price, taxonomy, or manufacturer) will be used to define a bid criteria. For example, in the user interface depicted in FIGS. 3A-3E, a user may select any one of price, taxonomy or manufacturer. As illustrated in FIG. 3D, more than one product condition may be selected for a rule definition. While taxonomy and manufacturer are selected in the embodiment depicted in FIG. 3D, it can be appreciated that any combination of price, manufacturer or taxonomy may be selected. Furthermore, other product conditions may be used in other embodiments. In the embodiment of FIGS. 3A-3E, the bid definition panel 330 also allows input of a priority for each bid rule in priority definition text field 333. It can be appreciated that when a user defines a priority using priority definition text field 333, bidding system may need to adjust the relative priority of already entered bid rules as described above.

FIG. 3A specifically illustrates an exemplary user interface for adding bid rules for merchant products based on the price of the products. In one embodiment, a user may select checkbox 331 indicating that a price condition is part of the rule definition for the bid rule. In one embodiment, a user may select one of a set of radio buttons 332 indicating the logical condition associated with the price value entered. For example, a user may define a price condition to be equal to, greater than, or less than a particular price. Alternatively, a user may define a range for the price condition such that the rule definition is satisfied if the price of a product is greater than a first value, but lower than a second value.

FIG. 3B specifically illustrates an exemplary user interface for adding bid rules for merchant products based on the taxonomy of the products. In one embodiment, a series of drop-down lists 335 are provided for a user to select an appropriate channel, category and/or sub-category for a particular product. Drop-down lists 335 may only be visible and active if taxonomy check box 334 is selected. The channel drop-down list may be pre-populated with descriptions of predefined product-groups at the most generic level. For example, the channel drop-down list may be pre-populated with descriptions such as appliances, sporting goods, computers, musical instruments and the like. Once a user selects a channel, bidding system 130 then populates the category drop-down list with the available categories within that channel. For example, if a user selects appliances as the channel, the category drop-down may populate with descriptions such as air cleaners and heating appliances, home appliances, large kitchen appliances, laundry, small kitchen appliances, vacuum cleaners, and the like. After a user selects a category, bidding system 130 will then populate the sub-category drop-down list with the available sub-categories within the category. For example, if a user selects appliances as the channel and laundry as the category, the sub-category drop-down may populate with descriptions such as clothes dryers, clothes irons, laundry parts and accessories, washer/dryer combos, washing machines, and the like. By allowing pre-population of drop-down lists for product conditions based on taxonomy, bidding system 130 insures that only valid rule definitions may be submitted by merchant computing systems 140.

FIG. 3C specifically illustrates an exemplary user interface for adding bid rules for merchant products based upon product manufacturers. In one embodiment, check box 336 may be selected indicating that a rule definition comprising a manufacturer product condition is being added. Once check box 336 is selected, manufacturer text field 337 may be visible so that a user may enter a manufacturer for triggering the product condition. In one embodiment, a list of available manufacturers matching the text entered by the user is displayed so that the user may select a manufacturer from the available list. For example, in FIG. 3C, the user typed "Sony" and all manufacturers starting with "Sony" were displayed in an available list. The user may then select a manufacturer from the list of available manufacturers. By allowing selection from an available list of manufacturers, bidding system 130 insures that only valid rule definitions may be submitted by merchant computing devices.

Figure 3E:
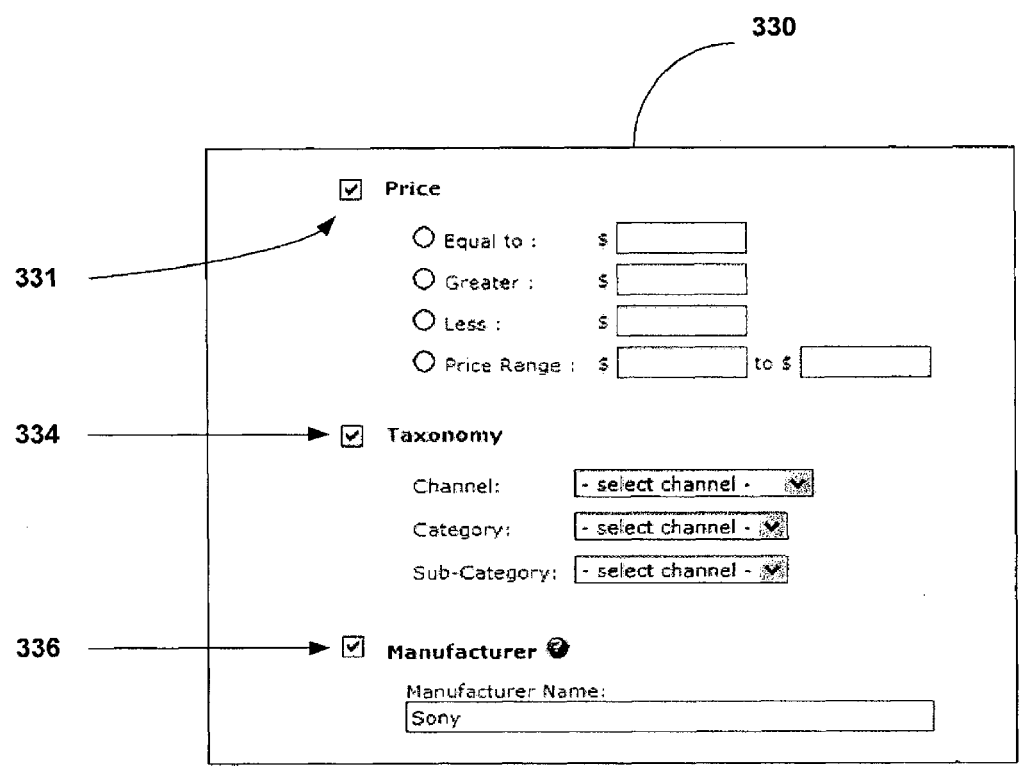

FIGS. 3D and 3E illustrate exemplary user interfaces for adding bid rules for merchant products based on multiple product conditions. In FIG. 3D, check boxes 334 and 336 are selected indicating that the rule definition for the bid rule will comprise a product conditions related to taxonomy and manufacturer. In FIG. 3E, check boxes 331, 334 and 336 are selected indicating that the rule definition for the bid rule will comprise a product conditions related to price, taxonomy and manufacturer. While not shown in the figures, it may be appreciated that the rule definition of a bid rule may include any combination of price, taxonomy and/or manufacturer. In one embodiment, the entry of price conditions, taxonomy conditions and manufacturer conditions are completed in the same manner as described regarding FIGS. 3A-3C.

Figure 3F:
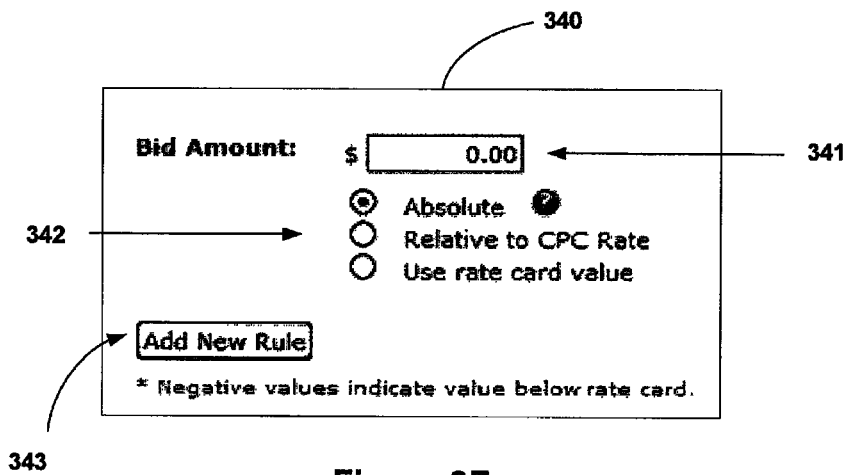
FIG. 3F illustrates an exemplary user interface for entering a bid amount. The bid amount can either be absolute, relative to the CPC rate card value, or equal to the CPC rate card value.

FIG. 3F illustrates an exemplary user interface for entering a bid amount, specifically, bid amount panel 340 that may be part of add new bid rule panel 320. In one embodiment, bid amount panel 340 may include text field 341 for entering a bid amount. Bid amount panel, in one embodiment, may also provide a set of radio buttons 342 for selecting the bid type. For example, a bid type may be absolute, relative to the CPC rate card rate, or equal to the rate card value. In one embodiment, when the absolute radio button is selected, a user may enter a value in text field 341 that will override the current CPC rate card rate for any products matching the associated bid criteria (where the bid rule is the highest priority matching bid rule). Alternatively, when the relative to the CPC rate card rate radio button is selected, a user may enter a value in text field 341 that is relative to the CPC rate card rate. In one embodiment, a negative value may be entered for a relative bid. In such cases, the resulting bid will result in a base CPC rate that is lower than the CPC rate card rate. In another embodiment, a percentage value may be entered for a relative bid. Percentages may be positive, indicating a percentage increase in the rate card rate, or negative, indicating a percentage decrease in the rate card rate. Alternatively, when the use rate card value radio button is selected, the resulting bid will be at the rate card rate. In one embodiment, when the use rate card value radio button is selected, text field 341 may be hidden from bid amount panel 340. In another embodiment, text field 341 may be deactivated, grayed out, or may prevent user input in some other manner.

Figure 4A:
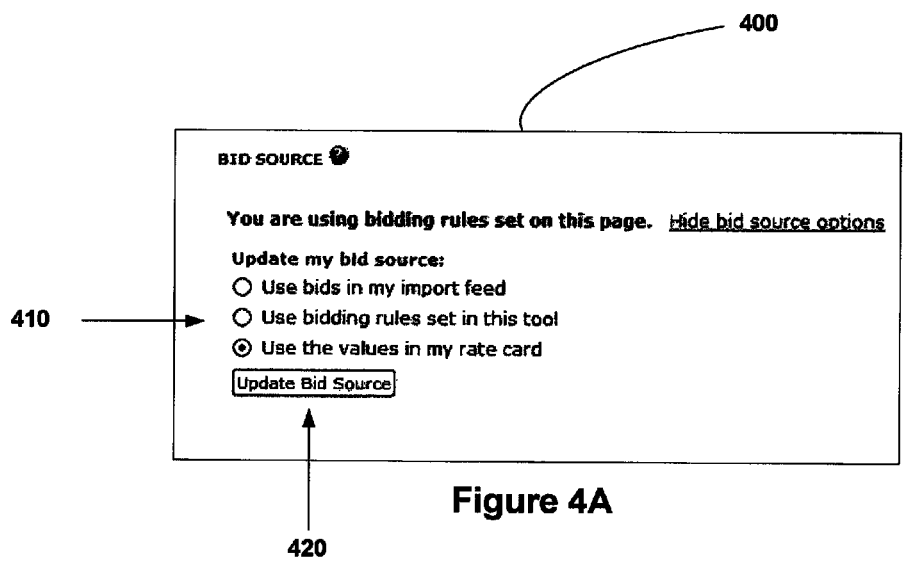
FIG. 4A illustrates an exemplary user interface for setting the source of bids for merchant product offers.

FIG. 4A illustrates an exemplary user interface for setting the source of bids for merchant product offers, specifically, bid source panel 400. Bid source panel 400 may include a set of radio buttons 410 indicating the source of bids. In one embodiment, set of radio buttons 410 may include a radio button for setting the source to the input feed. When selected, bids will be determined based on values imported from the data feed received by bidding system 130 from merchant computing systems 140 as described above. Set of radio buttons 410 may also include a use bidding tool radio button. When selected, bidding system 130 may use bids as determined based on bid rules defined via a bidding tool, such as bidding tool user interface 300, for example. The set of radio buttons may also include an option to allow the user to set the source of bids to the rate card. When selected, bids entered from the import feed or the bidding tool will be ignored by bidding system 130, and the base CPC rate of product offers will be set to the value indicated in the rate card.

Figure 4B:
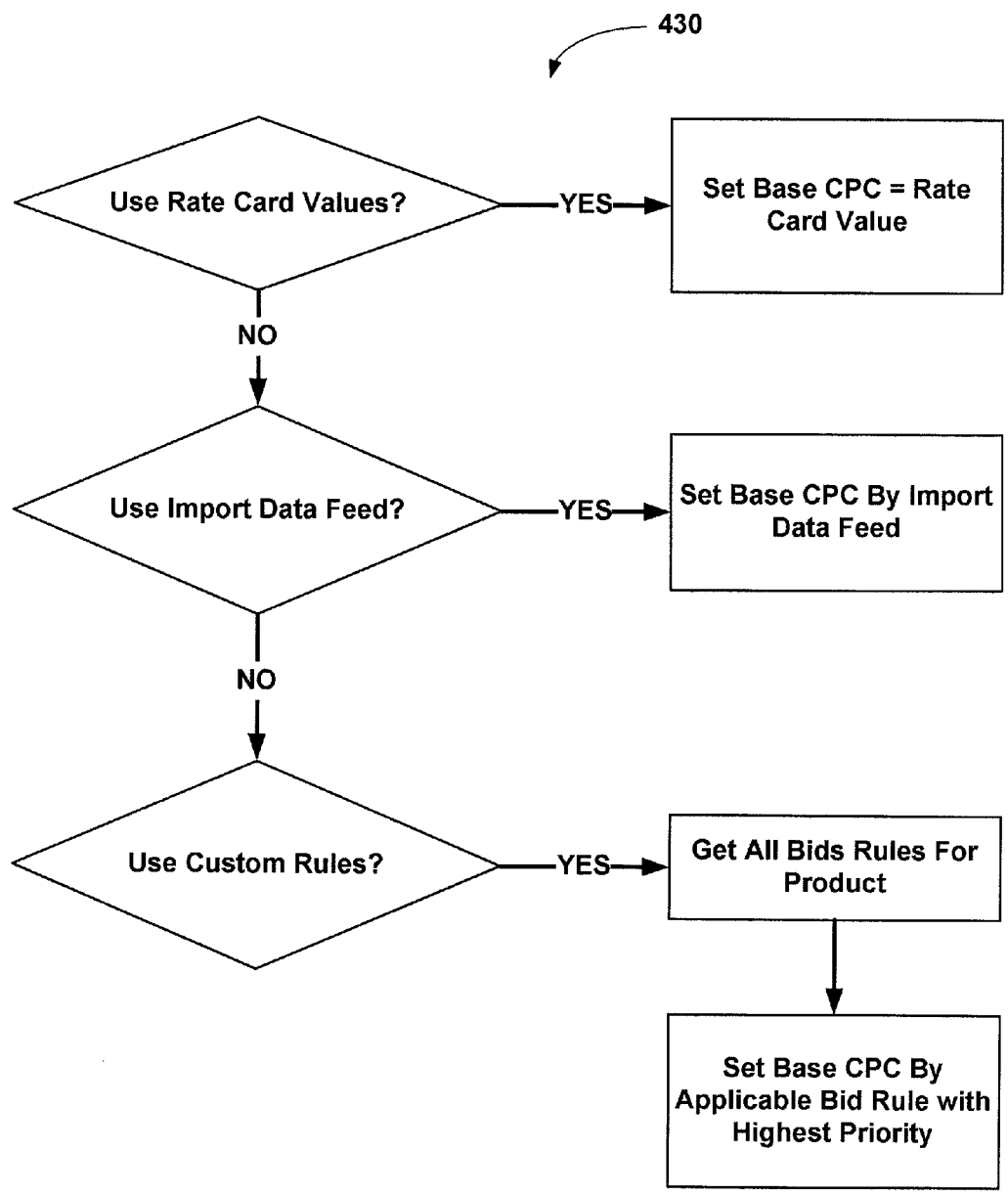
FIG. 4B is a flowchart illustrating one embodiment of a method for determining the rule for setting the CPC value for a product offer based on the selected source of bids.

FIG. 4B is a flowchart illustrating one embodiment of a method for determining the rule for setting the CPC value for a product offer based on the selected source of bids. In one embodiment, if the source of bids is set to use rate card values, then the base CPC for product offers is set to the rate card value for each of the respective products. Alternatively, if the source of bids is set to use the import data feed, the base CPC for product offers is set based upon information received from the data feed imported from merchant computing systems 140. Alternatively, if the source of bids is set to use custom bid rules, bidding system 130 calculates the CPC for each product based on the bid rules previously received from merchant computing systems 140. For example, bidding system 130 may access the bid rules defined by the merchant and identify the highest priority matching bid rule for each product in order to determine the CPC rate for the products.

Other Embodiments

Another embodiment of bidding platform computer system 130 allows a group voucher retailer ("GVR") to dynamically adjust CPC rates for the vouchers it offers for sale. A GVR is a merchant that sells vouchers or coupons that are redeemable for the goods or services of a different merchant or services provider. For example, a GVR might offer to sell a coupon for $10 providing for a 50% discount for a meal at a restaurant, or might offer to sell a coupon for $50 providing for a $100 discount for an appliance. A GVR, similar to a merchant operating merchant computing system 140, may provide a website where consumers may purchase the vouchers it offers for sale. To promote its voucher offers, a GVR may wish to direct consumer traffic to its website and might do so through advertising based on a CPC model. Like CPC rates for product offers, CPC rates for voucher offers may be defined by a rate card. A GVR may host a website where visitors may search for vouchers/coupons offered for sale. Additionally, one or more partners may host websites listing offers from one or more GVRs. Consumer computing system 130 may access the GVR or partner system to search for vouchers or coupons in an attempt to find the most attractive voucher/coupon. The GVR or partner system may, in turn, request from bidding system 130 a list of voucher offers. The bidding system 130 may return a list to the GVR or partner based in part on the CPC rate of voucher offers matching the request.

In one embodiment, bidding system 130 facilitates advantageous ad placement by accessing bids from computing systems operated by GVRs. GVRs may submit bid rules that determine when a bid to modify the CPC rate of voucher offers should trigger. Entry and application of bid rules to voucher offers is similar to the entry and application of bid rules to product offers as described in other embodiments above. For example, a GVR may enter a bid rule into bidding tool user interface 130 with a rule definition comprising criteria for identifying one or more vouchers the GVR is offering for sale. In another embodiment, bidding system 130 may receive bids from a data feed as opposed to a bidding user interface (similar to bidding tool user interface 300). The rule definition criteria may comprise price, taxonomy, brand (similar to manufacturer), and/or other criteria. For example, a rule definition may include taxonomy criteria such that a bid rule is triggered when the voucher or coupon may be redeemed at a services provider that belongs to channel "restaurants" and category "Italian." In another embodiment, the rule definition criteria may include brand or manufacturer criteria such that a bid rule triggers when the voucher may be redeemed at Restaurant A or a coupon applies to a product made by Brand X. In some embodiments, the rule definition criteria may include other attributes independent of price, taxonomy or brand, such as location (e.g., city and zip code), timing (e.g., expiration), or any other voucher-related attributes.

In one embodiment, bid rules submitted by the GVR may be assigned respective priorities. These priorities may be used in a similar manner as discussed above in order to determine an applicable bid rule of multiple bid rules each having bid criteria that match a particular offer.

Based on the bid rules defined by a particular GVR, the bidding platform may assign advertising rates to respective voucher/coupon offers of the GVR. For example, when a GVR provides a new voucher offer to the bidding platform, the bidding platform may analyze attributes of the offer, categorize the offer, and scan the bid rules to determine which of the GVR's bid rules match the attributes and/or categories. The matching bid rule (or the highest priority matching bid rule in the case where there are multiple matching bid rules) may then be used to set an advertising rate for the new voucher offer.

Depending on the embodiment, the bid amount may be absolute such that the bid amount is used in place of a base CPC rate defined in the rate card, or the bid amount may be relative such that the bid amount is used to modify the base CPC rate defined in the rate card by the bid amount.

All of the methods and tasks described herein may be performed and fully automated by a computer system. The computer system may in some cases include multiple distinct computers or computing devices (e.g., physical servers, workstations, storage arrays, etc.) that communicate and interoperate over a network to perform the described functions. Each such computing devices typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices such as solid state memory chips and/or magnetic disks, into a different state.

The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method of pre-assigning advertising rates to a plurality of products offered by a merchant, the method comprising:
    providing, by a bidding platform computing device, computer-executable code useable to generate a computer interface usable by a merchant in order to define bid rules for determining advertising rates for the plurality of products offered by the merchant, wherein each bid rule comprises:
        a bid amount indicating an absolute advertising rate or a relative bid adjustment to be made to a base advertising rate;
        a rule definition comprising criteria for identifying products of the merchant associated with the respective bid rule, the criteria comprising one or more price criteria, taxonomy criteria, or product manufacturer criteria; and
        a bidding priority indicating a respective priority of the bid rule in relation to other bid rules;
    transmitting the computer-executable code to a computing device of the merchant;
    receiving one or more bid rules defined by the merchant from the merchant computing device;
    applying the received one or more bid rules defined by the merchant to the plurality of products offered by the merchant, wherein the bidding priorities of respective bid rules are useable to determine which of one or more bid rules that each apply to a particular product to use in determining an advertising rate for the particular product; and
    determining and assigning, based on the applied one or more bid rules, advertising rates for the plurality of products.

2. The method of claim 1, wherein applying the received one or more bid rules comprises:
    for each of the plurality of products:
        identifying one or more bid rules having rule definitions matching attributes of the product;
        in response to identifying more than one bid rule each having rule definitions matching attributes of the product, selecting a bid rule of the more than one bid rules with a highest priority as the applicable bid rule;
        in response to identifying only one bid rule having a rule definition matching attributes of the product, selecting the only one bid rule as the applicable bid rule; and
        determining an advertising rate for the product using the bid amount of the applicable bid rule.

3. The method of claim 2, wherein said determining the advertising rate comprises:
    in response to determining that the applicable bid rule comprises an absolute advertising rate, setting the advertising rate for the product as the absolute advertising rate; and
    in response to determining that the applicable bid rule comprises a relative bid amount, setting the advertising rate for the product as the relative bid adjustment plus an applicable bid rate from a rate card.

4. The method of claim 1, further comprising:
    receiving a request for a product offer from a consumer computing device or from a partner computing device;

accessing the determined advertising rate for the product offer; and in response to providing the requested product offer to the consumer computing device, charging the merchant the determined advertising rate.

5. The method of claim 1, further comprising:

providing, with the bidding platform computing device, additional computer-executable code useable to generate a computer interface comprising a list of multiple products ordered at least in part by the respective calculated advertising rates of the multiple products; and transmitting the additional computer-executable code to a consumer computing device or to a partner computing device.

6. The method of claim 1, wherein at least some price criteria of respective rule definitions indicate that only products having prices that are less than, equal to, or greater than a threshold price match the respective price criteria.

7. The method of claim 1, wherein at least some price criteria of respective rule definitions indicate that only products having prices that are within a range of prices match the respective price criteria.

8. The method of claim 1, wherein at least some taxonomy criteria of respective rule definitions indicate that only products of a particular type match the respective taxonomy criteria.

9. The method of claim 8, wherein that particular type indicates one or more of a product channel, a product category or a product sub-category.

10. The method of claim 1, wherein at least some product manufacturer criteria of respective rule definitions indicate that only products manufactured by one or more manufactures indicated in the manufacturer criteria match the respective manufacturer criteria.

11. A computing system configured to assign advertising rates to a plurality of products of a merchant comprising:

one or more processors configured to execute software instructions;

a computer readable medium storing software instructions executable by the one or more processors in order to cause the computing system to perform operations comprising:

accessing a data structure including information regarding a plurality of products offered by a merchant:

accessing a data structure including information regarding bid rules of the merchant, the bid rules each including:

a bid amount indicating an absolute advertising rate or a relative bid adjustment to be made to a base advertising rate;

a rule definition comprising criteria for identifying matching products, the criteria comprising one or more price criteria, taxonomy criteria, or manufacturer criteria; and a bidding priority indicating a respective priority of the bid rule in relation to other bid rules, the bidding priority useable to determine one of the bid rules to apply to a particular product when more than one bid rule applies to the particular product;

for each product of the plurality of products:

identifying one or more bid rules having rule definitions matching attributes of the product;

in response to identifying more than one bid rule having respective rule definitions matching attributes of the product, selecting a bid rule of the more than one bid rules with a highest priority as the applicable bid rule;

in response to identifying only one bid rule having a rule definition matching attributes of the product, selecting the only one bid rule as the applicable bid rule; and determining and assigning an advertising rate for the product using the bid amount of the applicable bid rule.

12. The system of claim 11 wherein the operations further comprise:

generating a computer interface for inputting bid rules;

transmitting the computer interface to a merchant computing device, and receiving the bid rules from the merchant computing device.

13. The system of claim 11, wherein said determining the advertising rate comprises:

in response to determining that the applicable bid rule comprises an absolute advertising rate, setting the advertising rate for the product as the absolute advertising rate; and in response to determining that the applicable bid rule comprises a relative bid amount, setting the advertising rate for the product as the relative bid adjustment plus an applicable bid rate from a rate card.

14. The system of claim 11, wherein at least some price criteria of respective rule definitions indicate that only products having prices that are less than, equal to, or greater than a threshold price match the respective price criteria.

15. The system of claim 11, wherein at least some price criteria of respective rule definitions indicate that only products having prices that are within a range of prices match the respective price criteria.

16. The system of claim 11, wherein at least some taxonomy criteria of respective rule definitions indicate that only products of a particular type match the respective taxonomy criteria.

17. The system of claim 11, wherein that particular type indicates one or more of a product channel, a product category or a product sub-category.

18. The system of claim 11, wherein at least some product manufacturer criteria of respective rule definitions indicate that only products manufactured by one or more manufactures indicated in the manufacturer criteria match the respective manufacturer criteria.

19. A tangible non-transitory computer readable medium comprising computer-executable instructions configured to cause a computing device to perform operations comprising:

applying bid rules provided by a first entity to a plurality of goods and/or services offered by the first entity in a sequential order starting with a highest priority bid rule and ending with a lowest priority bid rule, wherein at least some of the goods and/or services have more than one applicable bid rule, the applying comprising, for each bid rule:

comparing a rule definition of the bid rule to attributes of respective goods and/or services that have not yet been assigned an advertising rate; and in response to identifying one or more goods and/or services having attributes matching the rule definition of the bid rule, assigning respective advertising rates to the identified one or more goods and/or services based on the bid amount of the bid rule.

20. The tangible computer readable medium of claim 19, wherein the first entity comprises a merchant or a group voucher retailer.

21. The tangible computer readable medium of claim 19, wherein the attributes of the goods and/or services include one or more of: price, taxonomy, manufacturer, brand, compatible brand, gender, size, and sales data.

22. A computer-implemented method of determining which bid rule defined by a merchant to apply to each of a plurality of products of the merchant comprising:

periodically applying a plurality of bid rules provided by a merchant to a plurality of products offered by the merchant in an order starting with a high priority bid rule having a highest bidding priority, and ending with a low priority bid rule having a lowest bidding priority, wherein at least some of the products have more than one bid rule having rule definitions matching attributes of the at least some products, wherein said periodically applying a plurality of bid rules comprises, for each bid rule:

determining any products of the products offered by the merchant that have not yet been assigned an advertising rate;

identifying any of the determined products that have respective attributes matching a rule definition of the bid rule; and assigning respective advertising rates to the identified products based on a bid type and a bid amount of the bid rule.

* * * * *